United States Patent [19]

Rawle et al.

[11] 4,278,350
[45] Jul. 14, 1981

[54] HUB ALIGNMENT

[75] Inventors: Michael D. Rawle, Abingdon; Peter E. G. Marshall, Haddenham, both of England

[73] Assignee: BL Cars Limited, London, England

[21] Appl. No.: 61,401

[22] Filed: Jul. 27, 1979

[30] Foreign Application Priority Data

Jul. 28, 1978 [GB] United Kingdom ............... 31492/78

[51] Int. Cl.³ .......................................... B01B 11/275
[52] U.S. Cl. ................................................... 356/155
[58] Field of Search ................... 356/155, 152; 33/264, 33/288, 203.18-203.2

[56] References Cited

U.S. PATENT DOCUMENTS

| 2,564,510 | 8/1951 | Shoemaker | 356/155 |
|---|---|---|---|
| 2,953,857 | 9/1960 | Mineck | 33/203.12 |
| 3,533,699 | 10/1970 | Hopkins et al. | 356/155 |
| 3,709,609 | 1/1973 | Spengler et al. | 356/155 |
| 3,936,195 | 2/1976 | Roesch | 356/375 |
| 3,953,134 | 4/1976 | Appel et al. | 356/155 |
| 4,097,157 | 6/1978 | Lill | 356/152 |
| 4,115,926 | 9/1978 | Hampton, Jr. et al. | 33/288 |
| 4,180,326 | 12/1979 | Chang | 356/152 |

FOREIGN PATENT DOCUMENTS

| 2353459 | 5/1975 | Fed. Rep. of Germany | 356/155 |
|---|---|---|---|
| 2727420 | 1/1979 | Fed. Rep. of Germany | |
| 2169991 | 9/1973 | France | |
| 1214019 | 8/1977 | France | |
| 661795 | 11/1951 | United Kingdom | |
| 629450 | 8/1978 | U.S.S.R. | 356/375 |

Primary Examiner—William H. Punter
Attorney, Agent, or Firm—Brisebois & Kruger

[57] ABSTRACT

Apparatus for measuring the road wheel hub alignment of a vehicle on its production line includes a pair of electro-optical units for attachment to a pair of road wheel hubs and a master control and display unit. The electro-optical units each comprise an array of photosensitive devices which are illuminated by a directional beam of light from the other unit, and include a display for indicating to an operator the state of alignment of the hub to which the unit is attached. Alignment of both hubs can be monitored by a display on the master control unit, which includes an output to a data recording means so that the state of alignment of the hubs on each vehicle passing down the line can be automatically recorded. The photo-sensitive devices are arranged in a radial plane of the axis about which the hubs swivel for adjustment, and in a plane perpendicular to the axis of rotation of the road wheels to enable simultaneous independent adjustment of the hubs.

9 Claims, 3 Drawing Figures

HUB ALIGNMENT

This invention relates to the measurement of vehicle road wheel hub alignment on a motor vehicle production line.

Until now such alignment has generally involved the use of optical arrangements which require the operator to use subjective judgment to correctly align two projected line images, the optical system being referenced to remote datums. Because of this it has been impracticable to ensure or monitor operator performance using the system in the course of mass production.

The present invention seeks to provide a solution to the above difficulties with on-line systems.

According to the present invention there is provided apparatus for measuring the alignment of a road wheel hub on a production line, comprising:

means for transmitting a beam of light between a pair of road wheel hubs and adapted to be connected to a first of said hubs in predetermined alignment therewith;

a photo-sensitive receiver adapted to be connected to the other of said hubs in a predetermined position; and a master control unit adapted to be located remote from said hubs and to receive signals from said photo-sensitive receiver;

said light beam and said photo-sensitive receiver co-operating to determine the state of alignment of said first hub and said master control unit emitting a signal indicative of said alignment.

Preferably a pair of light transmitting means are provided, one attached to each of a pair of hubs, and each illuminating in use a photo-sensitive receiver attached to the other hub.

An embodiment of the invention will now be described by way of example and with reference to the accompanying drawings, in which.

The drawings show apparatus in accordance with the invention, that is particularly arranged to measure the "toe-in" or "toe-out" of each of the two steerable hubs of a vehicle independently.

Figure 1:
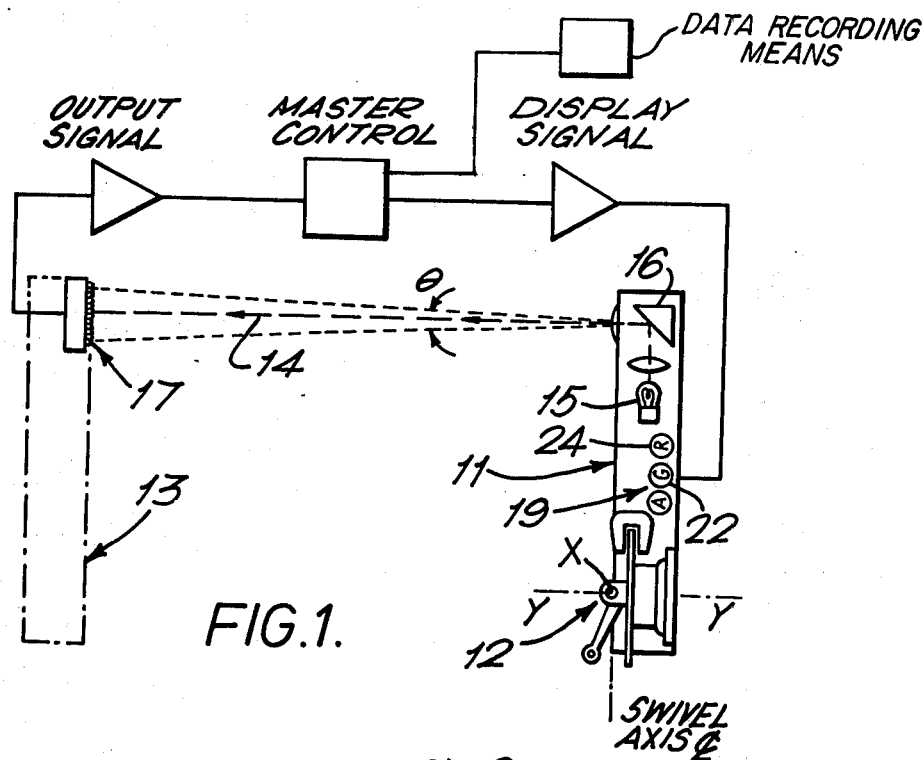
FIG. 1 is a schematic plan view of alignment apparatus in accordance with the invention.
Figure 2:
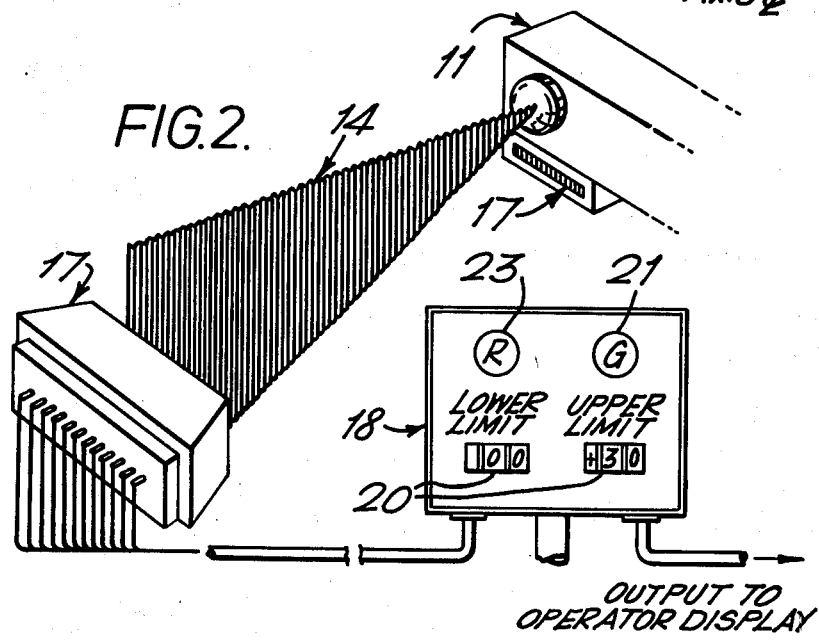
FIG. 2 is a perspective view of the apparatus of FIG. 1.
Figure 3:
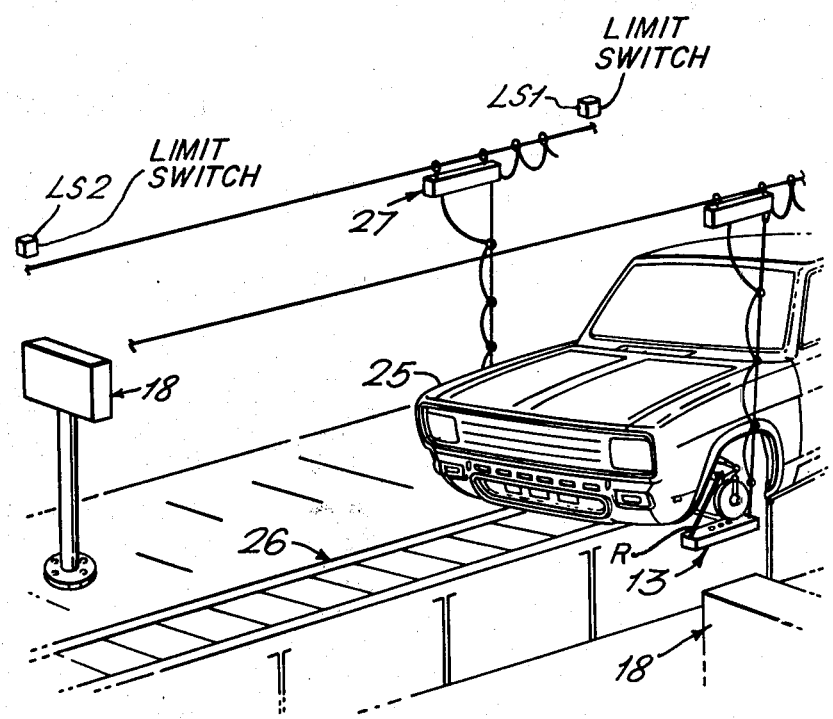
FIG. 3 shows a vehicle mounted on an assembly conveyor at a wheel hub alignment station incorporating the apparatus of FIGS. 1 and 2.

As shown in FIG. 1 the apparatus includes a right hand optical unit 11 which is attached to the right hand front, steerable road wheel hub 12 of the vehicle. A similar left hand optical unit 13 is attached to the left hand front, steerable road wheel hub (not shown). Each optical unit has a light source for transmitting a light beam 14, comprising an incandescent bulb 15 and a lens and prism system 16 which produces the beam configuration shown in FIG. 2, which is to say condensed in a horizontal plane but divergent in the vertical plane to accommodate tolerances in suspension height and camber angle of the hubs. It will be appreciated that other arrangements of light source could readily be employed if desired, such as a laser beam. The optical units are clamped to the hubs by electromagnets in precise locations and alignment so that the light beams are in a predetermined alignment with the respective hubs to which their sources are attached. Alignment with the axis of rotation of a hub is assured by clamping the unit onto the wheel mounting face of the hub, while predetermined alignment in a vertical plane, necessary because the hub is free to rotate, is provided by suspending the optical units from an overhead runway system by cantilevers which maintain the units in predetermined alignment with the runways and hence with the vehicle which moves on a conveyor parallel to the runways (FIG. 3). Alternatively, alignment with the suspension could be effected by attaching the unit both to the hub and to a suspension arm in predetermined manner.

Located in each optical unit below the light source is a horizontally disposed linear photo-diode array 17 connected in an electrical circuit with a master control and display unit 18 and an operator display 19. In operation of the apparatus, the light beam from one optical unit illuminates a point on the photo-diode array of the other unit to produce an output signal representative of the alignment of the wheel from which the light beam is projected. The output signal is compared by the master control unit 18 with the relevant vehicle toe angle limits which can be preselected by operation of thumbwheel switches 20 (FIG. 2). If the wheel alignment is within the limits the master control unit will illuminate green or GO lights 21 and 22 on the master and operator displays respectively. If the alignment is outside the limits red or NO GO lights 23, 24 are illuminated until the toe-angle has been adjusted. Thus it is the master control unit which makes the decision as to when the alignment is correct and not an operator reading an analogue instrument as in the past. Further thumbwheel switches are provided for scaling the outputs of the optical units to permit vehicles of different track-widths to be tested.

Operator performance can thus be monitored at the master control unit 18, so that the state of alignment of both hubs is known and moreover, the result of each alignment operation can be recorded by connection to, say, a printer, a computer or a counter, for use in quality audit date covering all vehicles.

The electrical circuitry contained in the master control unit 18 for comparing the measured toe angle with pre-set limits and illuminating the GO or NO GO lights can be devised without difficulty by a man skilled in the art, and accordingly will not be described in detail. An important feature of the invention provides, however, for the avoidance of unnecessary complication in the circuitry, namely the location of the array of photo-sensitive devices in a radial plane of the wheel's steering axis. As shown in FIG. 1, the array 17 is arranged on the face of the optical unit which lies in a radial plane from the hub's steering axis X, perpendicular to the rotational axis Y-Y. If the array were located in a plane which, whilst being perpendicular to the axis Y-Y, was also offset laterally from the steering axis X, the toe angles of the two hubs could not be adjusted independently, since as, say, the left hand hub and optical unit pivoted the array on that unit would be moved a significant distance longitudinally of the vehicle, altering the point at which rays from the right hand unit intersected the array and thus upsetting the adjustment of the right hand hub. Considerable complication of the electronic circuitry would be required to provide suitable compensation for the offset. Naturally some longitudinal movement of the array will occur by its rotation about the steering axis in the arrangement of FIG. 1, but such movement has been found to have negligible effect in practice: likewise there is of course some tolerance on the preciseness of location of the array in the plane of the steering axis before the offset requires compensation. Any significant offset, such as to permit location of the optical unit on a road wheel, for example, will require compensating means, however. An arrangement which can be fitted to the road wheel and locates the array in a radial plane of the steering axis is unlikely to be suitable for on-line usage owing to its bulkiness.

FIG. 3 illustrates a typical line installation incorporating the apparatus described above in use on a vehicle 25 mounted on a final assembly conveyor 26. The optical units 11 and 13 are suspended one at each side of the vehicle from a catenary cable feed system and spring balancer arrangement 27, which enables the units to be easily handled without risk of their being dropped and damaged, and ensures that they are aligned with the horizontal.

Alternatively, the optical units can be maintained in vertical alignment by using a member R engaging a suspension member of the hub.

In operation the vehicle trips a limit switch LS1 upon its entry to the wheel alignment station. The optical units are then positioned by the operators who press HOLD buttons (not shown) to energise the electromagnetic clamps. The units are then free to move with the vehicle as it moves along the conveyor while the operator at each wheel adjusts the toe angle for that wheel until a green or GO signal is displayed. When both operators have achieved a GO signal on the operator displays, the duplicated master control and display units 18 will then also show a GO signal which is latched on so that the final condition is still displayed after the operators have pressed RELEASE buttons to detach the optical units. The optical units are then returned to the station start ready for the next vehicle. To prevent equipment damage through overrun should an operator fail to detach a unit in time, a limit switch LS2 is incorporated into the catenary system, which is tripped as a vehicle leaves the station to sound an alarm and/or stop the conveyor, and to automatically release the optical units by switching off the electromagnets. There is also a master RELEASE button on the master control unit.

If either operator fails to achieve a GO signal when LS2 is tripped, the NO GO signal is latched on on his and the master display and is recorded to enable magnet RELEASE without delay.

Upon the next vehicle's entry to the wheel alignment station, LS1 is tripped causing the previously latched displays to be reset, and to enable the operators to energise the clamping electromagnets once more by pressing the HOLD buttons.

It will be seen that the illustrated embodiment provides hub alignment apparatus which is simple in construction and use, which obviates the need for the operator to use subjective judgment and which produces a recordable and monitorable output. The apparatus necessitates no physical connection across the vehicle between the measuring units, rendering the apparatus quickly attachable and detachable for on-line operations.

Moreover attachment of the optical units to the hubs in the illustrated arrangement rather than to the road wheels simplifies the location of photo-sensitive devices on a radius from the axis about which the hub is rotated during adjustment. This arrangement also renders the equipment particularly suitable for use on a production line, where the road wheels are only fitted toward the end of the assembly procedure.

It will be appreciated that many alternatives to the illustrated arrangement are possible within the scope of the invention. For example, the illustrated arrangement is ideally suited to the situation where the steering wheel is pinned in its "straight ahead" position during vehicle final assembly and each hub must be adjusted individually to the correct toe angle. Under other circumstances however, it may be preferred to adjust one wheel only, relative to the other, and to centre the steering wheel on its splines afterwards. In such circumstances only one optical unit need be used while in place of the other unit a mirror could be attached to the hub at a predetermined alignment so as to reflect the light beam back onto the photo-diode array of the single optical unit. Only one relative alignment of the wheels or toe angel could then result in illumination of a particular part of the array of produce a GO signal.

Again, whilst photo-diodes have been specified in the embodiment, there are other photo-sensitive receivers which could alternatively be used. Also if only one vehicle and toe angle were to be measured by the apparatus, the or each optical unit need only be provided with one photo-sensitive receiver which would be illuminated when the other or both wheels were correctly aligned.

Furthermore, whilst the embodiment illustrates measurements of front wheel toe-angle, the invention could be used to check rear wheel alignment on independent rear suspensions also, and include camber angle measurements for example. If it is desired to determine the actual toe-angle or camber, then the photo-diode array output signal could be processed to give a digital read-out on say an L.E.D. in degrees and minutes of arc. Otherwise, if a simple GO signal is required, then the light display could optionally be supplemented or replaced by an audible signal.

What is claimed is:

1. Apparatus for measuring the alignment of a road wheel hub on a production line, comprising:
   light transmitting means for transmitting a beam of light between a pair of road wheel hubs of a vehicle; each of said road wheel hubs pivoting about a respective axis for alignment, and each hub having a rotational axis;
   means for connecting said light transmitting means to a first of said hubs in predetermined alignment therewith;
   a photo-sensitive receiver;
   means for connecting said photo-sensitive receiver to the other of said hubs with said receiver substantially in the plane of the pivoting axis perpendicular to the rotational axis of the hub, and radially of the pivoting axis of the hub;
   a master control unit remote from said hubs to receive signals from said photo-sensitive receiver;
   said light beam and said photo-sensitive receiver cooperating to determine the state of alignment of said first hub; and
   said master control unit emitting a signal indicative of said alignment.

2. Apparatus as claimed in claim 1, wherein said photo-sensitive receiver comprises an array of photo-sensitive devices.

3. Apparatus as claimed in claim 1, including a pair of light transmitting means adapted to be attached to respective ones of said pair of hubs, and including a pair of photo-sensitive receivers adapted to be attached to respective ones of said pair of hubs, each for illumination by the light transmitting means on the other hub.

4. Apparatus as claimed in claim 1, including means mounted on the or each light transmitting means for producing a perceivable output only when the hub alignment is correct.

5. Apparatus as claimed in claim 4, wherein said means for producing a perceivable output comprises a light source which is illuminated when the hug alignment is correct.

6. Apparatus as claimed in claim 1, wherein said master control unit includes an output for connection to a data recording means.

7. Apparatus as claimed in claim 1, including means for maintaining the light transmitting means and the photo-sensitive receiver in correct vertical alignment while permitting movement of the hub along a production line.

8. Apparatus as claimed in claim 7, including an overhead track, wherein said alignment maintaining means comprises a cantilever suspended from an overhead track.

9. Apparatus as claimed in claim 7, wherein said alignment maintaining means includes a member for engaging a suspension member of the hub.

* * * * *